(12) United States Patent
Wolfe

(10) Patent No.: US 6,664,940 B2
(45) Date of Patent: Dec. 16, 2003

(54) APPARATUS AND METHOD FOR MASKING DISPLAY ELEMENT DEFECTS IN A DISPLAY DEVICE

(75) Inventor: Alan G. Wolfe, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 194 days.

(21) Appl. No.: 09/816,696

(22) Filed: Mar. 23, 2001

(65) Prior Publication Data

US 2002/0135731 A1 Sep. 26, 2002

(51) Int. Cl.$^7$ ................................................. G09G 3/36
(52) U.S. Cl. .......................................... 345/87; 345/904
(58) Field of Search .......................... 345/89, 87, 904, 345/108, 111, 100, 672, 674; 349/61, 62, 63, 110, 111, 42, 41, 33, 192

(56) References Cited

U.S. PATENT DOCUMENTS

| 5,339,093 A | * | 8/1994 | Kumagai et al. ............. 345/89 |
| 5,636,042 A | | 6/1997 | Nakamura et al. ........... 349/123 |
| 5,806,424 A | * | 9/1998 | Elliot ....................... 101/127.1 |
| 5,877,844 A | * | 3/1999 | Matsumoto .................. 355/35 |
| 5,926,246 A | | 7/1999 | Tomita et al. ............... 349/193 |
| 6,097,462 A | | 8/2000 | Koe ............................. 349/123 |
| 6,359,662 B1 | * | 3/2002 | Walker ........................ 348/743 |

* cited by examiner

*Primary Examiner*—Chanh Nguyen
(74) *Attorney, Agent, or Firm*—Dorsey & Whitney LLP

(57) ABSTRACT

The invention is directed towards an apparatus and method for masking display element defects in a display device. In one embodiment, the invention includes a display device with display elements disposed on a display surface, a translation unit that is coupled to the display device to impart periodic motion to the display surface, a display signal source capable of providing input signals to the display device, and a control unit coupled to the translation unit and the signal source to direct the movement of the display device and the signal source to correspondingly shift the display signals, which when displayed, conceal display element defects while presenting a stable image to a stationary viewer.

21 Claims, 4 Drawing Sheets

APPARATUS AND METHOD FOR MASKING DISPLAY ELEMENT DEFECTS IN A DISPLAY DEVICE

TECHNICAL FIELD

This invention relates generally to display devices, and more particularly, to a method of concealing display element defects in a display device.

BACKGROUND OF THE INVENTION

Various types of visual display devices are in widespread use to convert electrical signals into visual imagery. For example, there are emissive displays such as cathode ray tubes (CRT), light-emitting diode (LED) displays, field emission displays (FED), and gas discharge (plasma) displays. There are also non-emissive displays, such as liquid crystal displays (LCD), electrochromatic displays and electrocolloidal displays. The following discussion applies to all of these types of displays.

In a visual display device, the image is generally formed on a display surface of the device by selectively stimulating, through electronic means, discrete elements positioned on the display surface. The discrete display elements vary in light intensity and/or color in response to the applied electrical stimulation so that a plurality of adjoining areas of differing light intensity and/or color are obtained on the display surface. In particular, when the display elements are very small in comparison to the size of the display surface, a viewer of the display screen perceives a continuous image.

An active matrix liquid crystal display (LCD) is a good example of the utility of this display technology. The LCD generally includes a pair of opposed glass substrates that are bonded together to form an enclosed volume that is filled with a liquid crystal material. The interior surface of one of the substrates is continuously coated with a layer of a conductive material to form a display surface, while the interior surface of the opposing substrate is patterned into individual display element electrodes that are arranged in a matrix fashion. Associated with each display element electrode is a switching element, generally comprised of a Thin Film Transistor, or a Metal Insulator Metal diode. Selection or non-selection of the display elements is achieved by the switching operation of the switching elements to make the display operable. A back lighting system is generally located behind the substrate opposite the display surface to transmit light through the substrates and the liquid crystal material so that a luminous display is visible to the user.

Most commonly, two display modes are used in active matrix LCD displays. In the "normally black" mode, the back lighting system is shielded from the viewer by the liquid crystal when no signal is applied to a display element electrode. When a signal is applied to the display element electrode, light is transmitted through the display element, and is perceived by the viewer as an illuminated area. An alternative mode, referred to as the "normally white" mode, allows light to be transmitted when no signal is applied to the display element electrode, and correspondingly shields the back lighting system when a signal is applied to the display element electrode.

The switching elements, display element electrodes, and interconnections are generally patterned onto the substrate using well-known semiconductor fabrication methods to achieve a complex multilayered structure consisting of layers of semiconductor materials, insulating materials, and various types of metals. Although the frequency of fabrication defects occurring in the formation of the elements, electrodes, and interconnections is generally low, when an active matrix LCD includes several hundred thousand display elements, the probability that numerous switching devices, electrodes, and/or interconnections on the substrate will be abnormally formed is not insignificant. Consequently, the display elements associated with these defective structures will not operate as intended, and are generally perceived by the user as a display element that exhibits a constant white condition, or conversely, a constant black condition, depending on the mode of operation of the display. The presence of the foregoing display element defects may therefore degrade the image forming capability of the visual display to the point that it is unacceptable for end-use.

Presently, the high yield production of active matrix LCDs without display element defects presents a significant technical challenge. In general, displays are fabricated with some acceptable number of defects, which are corrected through the application of various techniques, in order to improve the yield of acceptable displays. In low-resolution displays, the usual yield inhibitor is the presence of only a moderate number of individual display element defects. In higher resolution arrays, where the contribution of an individual display element to the overall image is much less significant, the presence of array-line defects is of principal concern. Accordingly, considerable effort has been directed towards the development of techniques to correct or conceal display element defects of these types in order to salvage defective displays.

The correction of individual display element defects in active matrix LCD displays has received considerable attention. For example, U.S. Pat. No. 5,638,199 to Tsubota, et al. describes a repair method for a defective "bright spot" display element whereby a photosensitive resist is applied to the substrate on the display side of the device, followed by the projection of a light source through the display while all of the display elements in the display are activated. Locations in the display where the light projects through the display therefore correspond to defective display elements, and exposure of the photosensitive resist to the light source occurs at these locations. Upon development of the resist, an opaque layer is formed that conceals the "bright spot" defect. A particular shortcoming of this technique is that it introduces several new steps in the display fabrication procedure, and accomplishes only the opaque masking of "bright spot" defects.

Other prior art methods selectively alter the structure of the substrate surface in order to reorient the liquid crystal molecules so that a display element defect is concealed. For example, U.S. Pat. No. 5,926,246 to Tomita, et al. describes a method where the aligning film in a defective display element is irradiated by a laser to form minute grooves oriented in a direction that differs from the grooves that were originally present on the aligning film. As a result, the twist orientation of the liquid crystal molecule is altered, so that the light transmission qualities of the display element are permanently altered, thus making a "bright spot" defect in the display less conspicuous. A similar method is described in U.S. Pat. No. 5,636,042 to Nakamura, et al., wherein a series of randomly oriented grooves are formed on the aligning film by irradiation of the defective display element by a laser. The random aligning grooves permit the liquid crystal molecules to be oriented with a plurality of different twists and orientations thereby achieving an overall muting of a "bright spot" defect.

A significant shortcoming present in the foregoing methods is that the defective "bright spot" pixel must be individually corrected by selectively forming new aligning grooves in the aligning film to achieve the desired attenuation in illumination level. In a display containing a large number of display elements, correction of even a modest number of defective display elements will be a time consuming task, rendering these methods suitable for salvaging defective displays with only small numbers of display element defects.

Still other prior art methods seek to minimize the occurrence of defective display elements by providing redundant components during fabrication of the display. These prior art methods are directed in particular towards the correction of array-line defects referred to earlier. For example, U.S. Pat. No. 5,490,002 to Nicholas describes an active matrix device that uses two parallel-connected switching elements to provide fault tolerance in the event that a switching element is abnormally formed as an open circuit, while allowing a short circuited device to be removed by selective laser scribing.

These prior art methods have the disadvantage of requiring the selective correction of individual defective display elements through the application of laser scribing techniques to activate the redundant components, and to deactivate the defective components, which limits the practical applicability of such methods to displays with a small number of display element defects. Additionally, these methods may not correct instances where the display element failure has resulted from the failure to properly form other essential components of the display element, such as the electrode, or other interconnections, since these methods generally contemplate the failure of switching components only.

SUMMARY OF THE INVENTION

The invention is directed towards apparatus and methods for masking display element defects in a display device. In one aspect, an apparatus in accordance with the invention includes a display device that includes a plurality of display elements disposed on a display surface, at least one display element being at least partially defective, a translation unit that is coupled to the display device that is structured to impart a periodic motion to the display surface, a display signal source capable of providing input signals to the display device, and a control unit that is coupled to the translation unit and the signal source that controllably directs the movement of the display device and controllably directs the signal source to correspondingly shift the display signals. The shifted display signals, when displayed, conceal display element defects while presenting a stable image to a stationary viewer. In another aspect of the invention, the display unit is comprised of horizontal and vertical linear supports that permit the translation unit to translate the display in horizontal and vertical directions, the control unit is further comprised of horizontal and vertical actuators, and the control unit is further comprised of horizontal and vertical position sensors.

DETAILED DESCRIPTION OF THE INVENTION

The present invention is generally directed to an apparatus and method for masking defective display elements in a visual display device. Many of the specific details of certain embodiments of the invention are set forth in the following description and in FIGS. 1 through 7 to provide a thorough understanding of such embodiments. One skilled in the art will understand, however, that the present invention may have additional embodiments, or that the present invention may be practiced without several of the details described in the following description. For example, the embodiments of the invention as discussed below disclose motion of the display surface along two mutually-orthogonal axes. It is understood, however, that the present invention may include movement of the display surface along a third axis that is mutually orthogonal to the two axes described in connection with the disclosed embodiments. Further, it is understood that the display surface may be moved relative to a non-orthogonal axis system, or may be rotated and/or translated relative to a polar coordinate system. One skilled in the art would possess the ability to practice the disclosed invention with a motion along a third axis, or with motions relative to a non-orthogonal system without undue experimentation.

Figure 1:
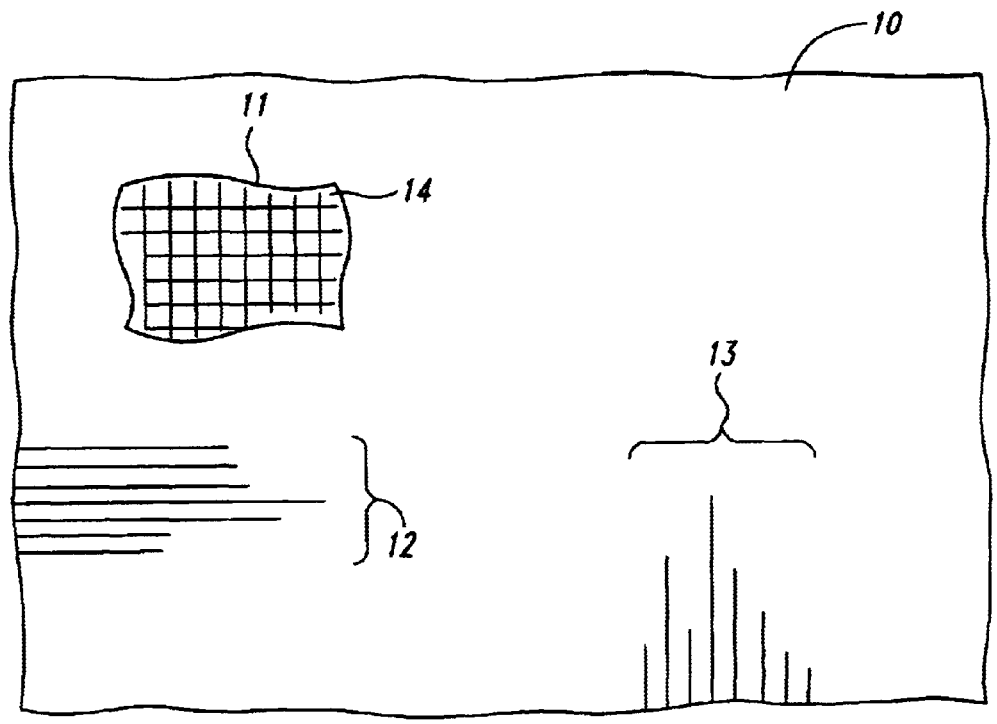
FIG. 1 is a frontal view of a display surface showing a group of display elements on the display surface.

FIG. 1 shows a frontal view of a display surface 10 that is comprised of an array of individual display elements 14. For clarity, the display elements 14 are shown only for a selected surface region 11 on the display surface 10. One skilled in the art will understand, however, that the display elements 14 are generally arranged into a known number of horizontal rows 12 and vertical columns 13 to substantially occupy the entire viewing area of the display surface 10. Further, it is understood that the display elements 14 may include a single display element, or may be comprised of a larger group, or subgroups of contiguous display elements. Moreover, one skilled in the art will understand that in foregoing description, picture elements, or pixels, generally correspond to the image elements described herein. Additionally, the display surface 10 may be comprised of any of the display technologies previously discussed.

Figure 2:
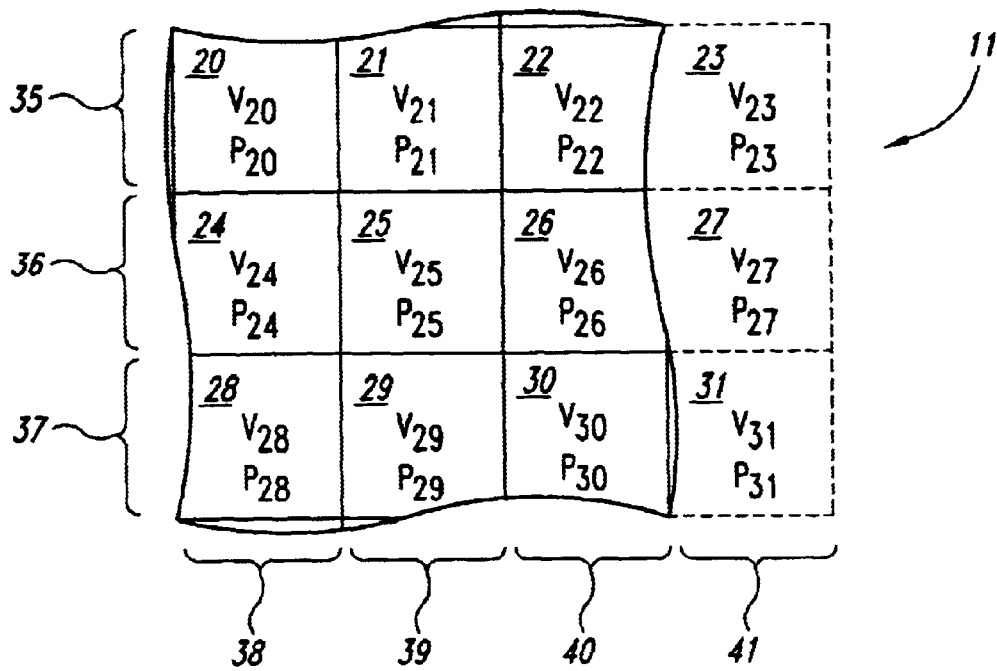
FIG. 2 is an enlarged view of a portion of the display surface showing display elements and image areas on the display surface.

Turning now to FIG. 2, an enlarged view of the selected surface region 11 of a display surface is shown, which depicts in greater detail the features present in the surface region 11. The following discussion will be limited to a small group of display areas on the display surface to better illustrate the disclosed apparatus and method, and is presented for purposes of description only. One skilled in the art will understand that the disclosed apparatus and method may be extended to the entire display surface 10, as shown in FIG. 1.

Still referring to FIG. 2, the region 11 shows adjoining display elements 20–31 that correspond to physical areas on the display surface 10. Associated with the display elements 20–31 are image elements $P_{20}$–$P_{31}$ that are individually projected onto the region 11 by the image signals $V_{20}$–$V_{31}$ to create an image, or a portion of an image, that may be visually perceived. As previously discussed, the image elements $P_{20}$–$P_{31}$, produced by the image signals $V_{20}$–$V_{31}$ may be created by emitting light, or by causing a change in the light transmission characteristics of the display elements 20–31 or by still other means to visually convey the information associated with the image signals $V_{20}$–$V_{31}$ to a viewer.

FIG. 2 further shows the display elements 20–31 on the region 11 arranged into rows 35–37, and columns 38–41, as shown. For purposes of description, a single display element 25 that is located in the region 11 is at least partially unresponsive to the applied input signal $V_{25}$, while display elements 20–23, 24, 26, 27 and 28–31 are fully responsive to the image signals $V_{20}$–$V_{23}$, $V_{24}$, $V_{26}$, $V_{27}$ and $V_{28}$–$V_{31}$, and therefore function normally. The defect that exists at the display element 25 may exhibit constant illumination, partial illumination, or no illumination, depending on the display technology used, and the particular mode of failure. Due to the defect in the display element 25, the image element $P_{25}$ associated with the image signal $V_{25}$ does not fully appear in the display element 25.

Figure 3:
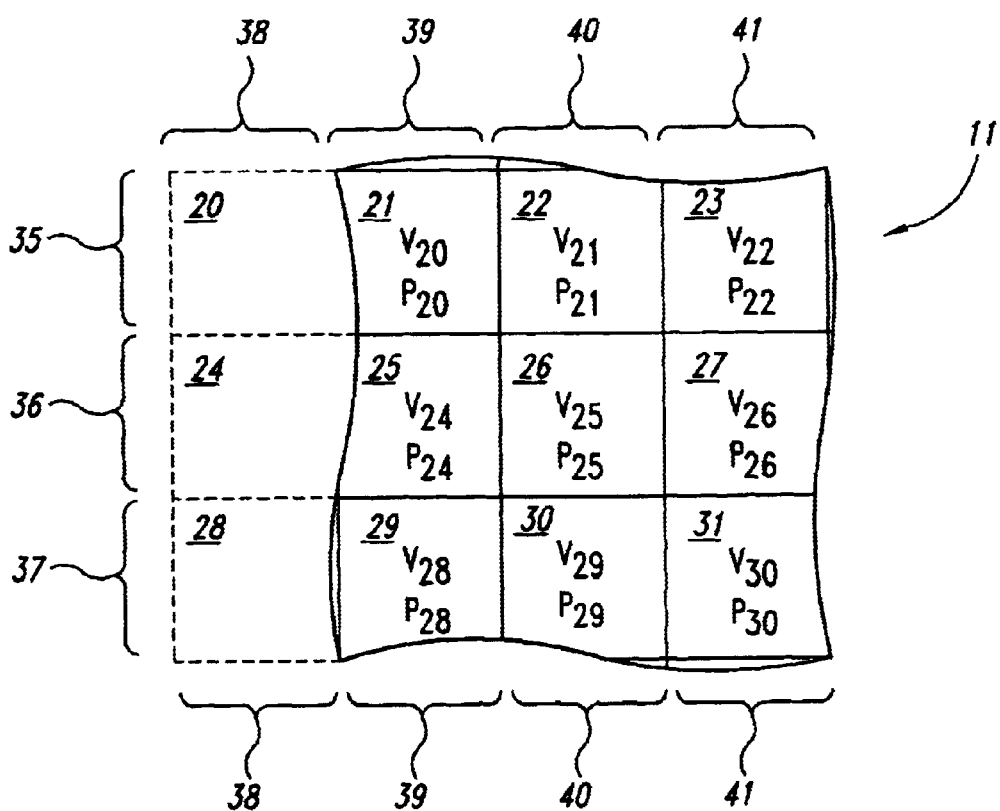
FIG. 3 is an enlarged view of a portion of the display surface showing the physical shifting of the display elements and the shifting of the image areas.

FIG. 3 shows the region 11 with the single defective display element 25 after the region 11 has been physically translated a distance of one column width to the left. The apparatus for accomplishing the physical translation of the region 11 will be more fully discussed below. In response to the physical translation of the region 11 to the left, the image elements $P_{20}$–$P_{31}$ must be simultaneously translated a corresponding distance to the right, which is accomplished by redirecting the image signals $V_{20}$–$V_{31}$ one column width to the right in order for the image to appear untranslated on the region 11 with respect to a viewer. As a result, the information that was previously associated with the input signal $V_{25}$ that could not be fully viewed because the image element $P_{25}$ coincided with a defective display element 25, is now viewed in display element 26. At the same time, although the region 11 has been translated by the width of one column, the image element $P_{25}$ has maintained a position that is unchanged relative to a viewer of the region 11. After all of the image elements $P_{20}$–$P_{3}$, have been displayed by the redirected image signals $V_{20}$–$V_{31}$, the region 11 is physically translated one column width to the right so that the image elements $P_{20}$–$P_{31}$ are projected onto display elements 20–31 as initially positioned and shown in FIG. 2, whereupon the image is displayed again.

Figure 4:
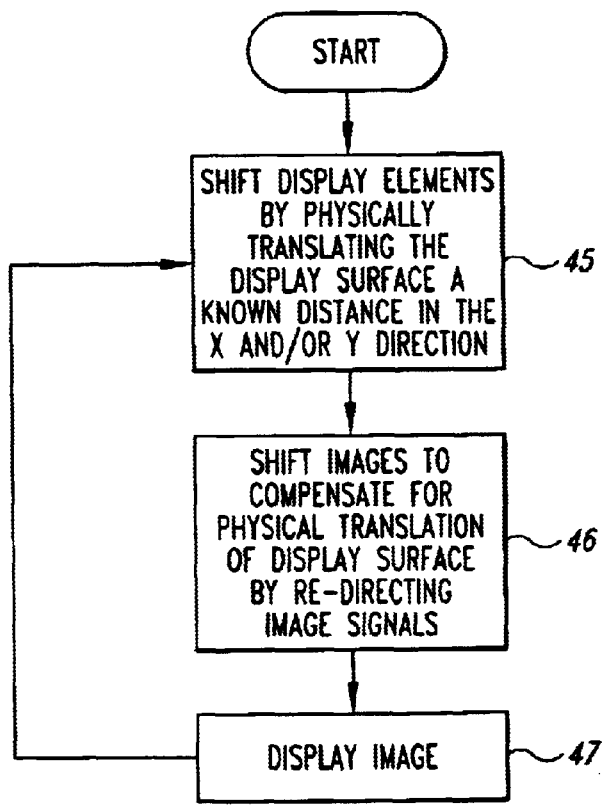
FIG. 4 is a flowchart of a method of masking defective display elements according to an embodiment of the invention.

With reference now to FIG. 4, a method for recursively implementing the procedure previously described is shown. At step 45, all of the display elements on the display surface are physically translated a known distance, either vertically and/or horizontally with respect to a stationary viewer. If display element defects are essentially unitary and widely dispersed across the area of the display surface, movement in either the horizontal direction, as described with reference to FIGS. 2 and 3, or in a vertical direction may be used to equal advantage. However, if the display element defect extends across the display surface in a predominant direction, physical translation of the display areas in a direction substantially perpendicular to the predominant direction may be preferred. For example, active matrix liquid crystal displays are subject to fabrication defects that generally result in the loss of at least a portion of a row of display elements on the display surface. In masking a defect of this type, a vertical movement of the display would be favored, as opposed to horizontal movement, since the defective display elements that extend along a substantial portion of the row length are too distant from other non-defective display elements present in the same row. In contrast, physically translating the defective display elements in the row in a vertical direction would have the advantageous effect of using the functioning display elements located immediately above or below the non-functioning row. Alternatively, a combination of horizontal and vertical physical translations could be employed to mask a defect of this type.

The distribution of the defective display elements present in the display may be ascertained prior to the formulation of the path for physically translating the display. For example, if the display defects are preponderantly row defects, then a generally vertical translation will be effective in masking these defects, as described above. However, if the defects consist predominantly of contiguous display elements, then a combination of horizontal and vertical translations and/or translations through more than a single display element width might be most effective in concealing these defects. The distribution of defects in the display may be conveniently assessed by simultaneously providing a uniform input signal to each display element, and visually assessing the distribution of defects on the display surface.

Still referring to FIG. 4, step 46 requires that the image elements be moved a distance that equals the physical translation distance of step 45, but in the opposing direction, so that the position of the respective image elements remains stationary with respect to the viewer. As previously described, the translation of the image elements occurs by redirecting the corresponding image signals to different display elements. At step 47, the shifted image is displayed to the viewer, by the well-known methods of raster scanning, or by matrix addressing the discrete elements in the display surface. After the shifted image is displayed, the display elements may be physically translated back to their respective initial positions by returning to step 45. Alternatively, the display may be physically translated in still another direction at step 45, to conceal other defects, before returning to the initial display position.

The repetitive physical movement of the display elements when combined with the corresponding shift in the images being displayed presents to a viewer the perception of a complete image on the display surface 10 (as shown in FIG. 1). This has the advantageous effect of allowing the image associated with the defective display element to be intermittently viewed by periodically shifting the image away from the defective display element. If the periodic shifting of the display elements occurs with sufficient rapidity, the intermittency of the image obtained thereby will become less apparent to the viewer, who will perceive a stable, non-flickering image. Since it is well established that intermittent imagery presented to a human viewer appears to be continuous if the frequency of repetition is greater than about 50 Hz, it follows that if the display elements are physically translated at approximately this frequency, a continuous image will be perceived by the viewer. Although the foregoing discussion has disclosed movement of the display in horizontal and/or vertical directions, it is understood that the display may be moved in a third direction that is orthogonal to the horizontal and vertical directions.

Figure 5:
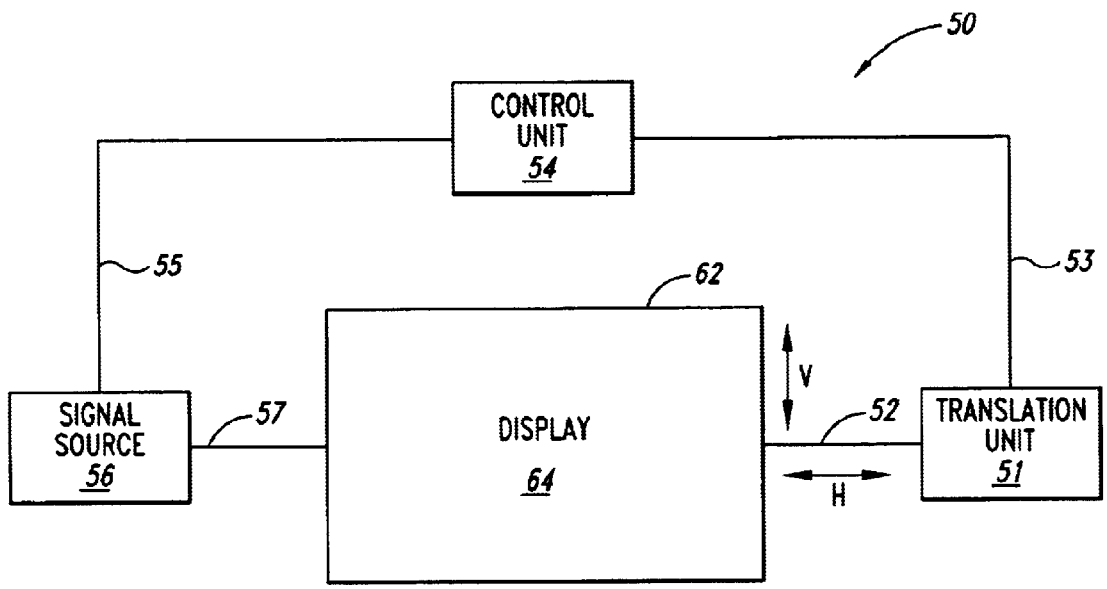
FIG. 5 is a schematic view of an apparatus for masking defective display elements according to an embodiment of the invention.

Turning now to FIG. 5, a schematic view of an apparatus 50 for masking defective display elements according to an embodiment of the invention is shown. As shown therein, a visual display 62 having a frontally disposed display surface 64 is positioned within the field of view of a viewer (not shown). While the display 62 may be comprised of any of the display devices previously discussed, the display 62 is a flat panel display with low mass. The display 62 is coupled to a translation unit 51 that is structured to impart a controllable mechanical translation to the visual display 62 by a coupling 52. The coupling 52 may be comprised of an electromagnetic coupling between the translation unit 51 and the display 62, so that no mechanical coupling between the translation unit 51 and the display 62 is required. Alternatively, the coupling 52 may be comprised of a mechanical coupling between the translation unit 51 and the display 62. The motion imparted to the display 62 may be in a substantially horizontal direction, as indicated by the arrow H, or alternatively in a substantially vertical direction, as indicated by the arrow V. More generally, however, the motion imparted to the display 62 will consist of some combination of motions in the H and V directions. The display 62 is also electrically coupled to a display signal source 56 that provides input signals to the display 62 through a signal line 57. The source 56 may consist of any device capable of providing input signals to a display device, such as a display driver attached to a computer, or an analog video signal source. In order to obtain a stable image on the display surface 64, a control unit 54 is provided to synchronize the display signals (not shown) transferred from the source 56 to the display 62 with the physical translation of the display 62. The control unit 54 is structured to transmit and receive signals to the translation unit 51 through a line 53, and to transmit signals to the display signal source 56 through a line 55. The signal line 57, and lines 53 and 55 may be comprised of electrical conductors, or alternatively, may consist of wireless signal paths to permit the translation unit 51, control unit 54, signal source 56 and the display device 62 to interact in a wireless manner.

Figure 6:
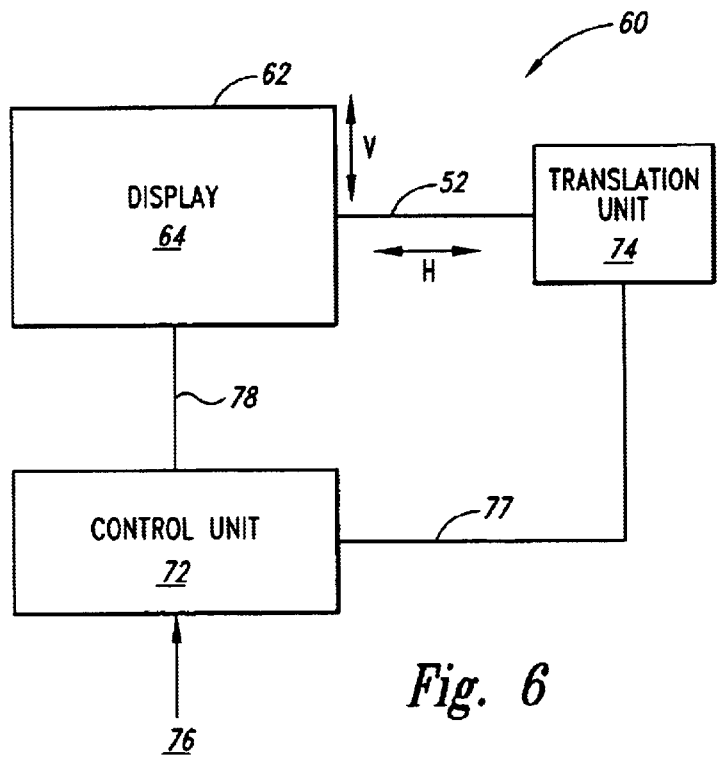
FIG. 6 is a schematic view of an apparatus for masking defective display elements according to another embodiment of the invention.

Referring now to FIG. 6, a schematic view of an apparatus 60 for masking defective display elements according to another embodiment of the invention shows a visual display 62 having a frontally disposed display surface 64 positioned within the field of view of a viewer (not shown). The display 62 is coupled to a translation unit 74 that is structured to impart a controllable mechanical translation to the visual display 62 by a coupling 52. As previously discussed, the coupling 52 may be comprised of an electromagnetic coupling between the translation unit 74 and the display 62, or the coupling 52 may be comprised of a mechanical coupling between the translation unit 74 and the display 62. The motion imparted to the display 62 may be in a substantially horizontal direction, as indicated by the arrow H, or alternatively in a substantially vertical direction, as indicated by the arrow V. More generally, however, the motion imparted to the display 62 will consist of some combination of motions in the H and V directions. The display 62 is also electrically coupled to a control unit 72 that accepts image signals 76 from an image signal source. The source may consist of any device capable of providing input signals to a display device, such as a display driver attached to a computer, or an analog video signal source. The control unit 72 synchronizes the image signals 76 with the physical translation of the display 62, and is structured to transmit and receive signals to the translation unit 74 through a line 77, ant to transmit shifted image signals to the display unit 62 through a line 78. The lines 77 and 78 may be comprised of electrical conductors, or alternatively, may consist of a wireless signal path to permit the translation unit 74 and display unit 62 to wirelessly interact with the control unit 72.

Figure 7:
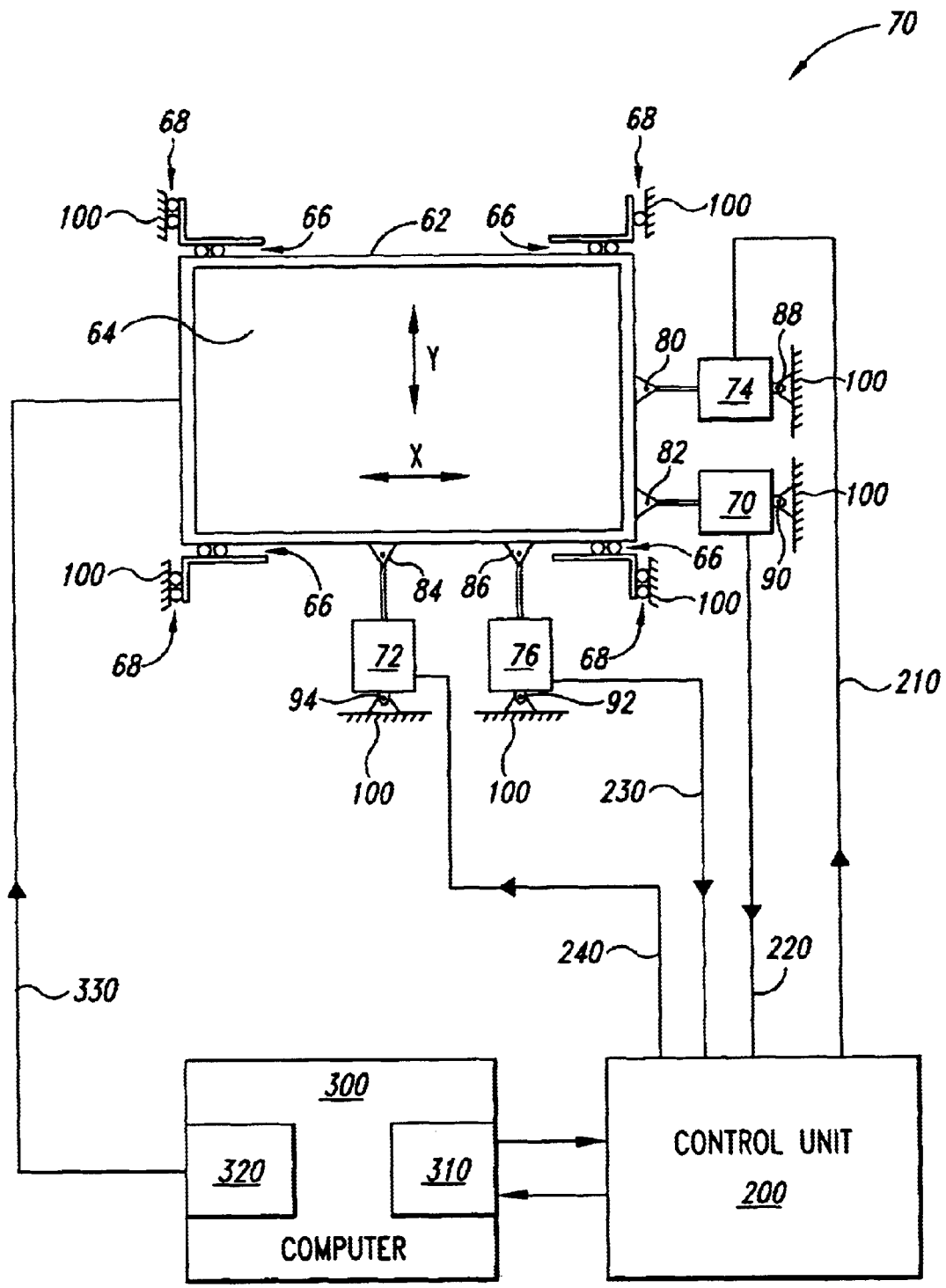
FIG. 7 is a schematic view of an apparatus for masking defective display elements according to an alternative embodiment of the invention.

Referring now to FIG. 7, a schematic view of an apparatus 70 for masking defective display elements according to an alternative embodiment of the invention is shown. As in the previous embodiment, a visual display 62 having a frontally disposed display surface 64 is positioned within the field of view of a stationary viewer (not shown). The display 62 is constrained to move in the horizontal direction by a relatively low-friction horizontal sliding means 66 that permits the translational movement of the device 62 in the x-direction, as shown. The device 62 is further constrained to move in the vertical direction by a similar low-friction vertical sliding means 68, that permits the translation of the device 62 in the y-direction, also as shown. The horizontal sliding means 66 and the vertical sliding means 68 may allow movement of the device 62 solely in the x-direction or the y-direction by translating along these directions independently, or, alternatively, the sliding means 66 and 68 may act cooperatively to permit the translation of the device 62 in any direction intermediate between the x and y-directions. The horizontal sliding means 66 and vertical sliding means 68 may be comprised of linear ball or roller bearings. Alternatively, gas-lubricated linear bearings may also be used, although still other equally acceptable alternatives exist.

With reference still to FIG. 7, horizontal motion is imparted to the display 62 by a horizontal actuator 74 that is hingeably attached to the display 62 by a rotational mount 80. The actuator 74 is also similarly hingeably attached to a stationary, supporting structure 100 by rotational mount 88. A vertical actuator 72 that is hingeably attached to the display 62 by a rotational mount 84, and to the stationary support structure 100 by a rotational mount 94 imparts vertical motion to the display 62. The horizontal actuator 74 and vertical actuator 72 may be separately actuated to impart motion in the x-direction, or the y-direction, respectively. Alternatively, actuators 72 and 74 may be actuated simultaneously and cooperatively to impart translational motion in a direction intermediate between the x and y directions. The horizontal actuator 74 and vertical actuator 72 may be comprised of piezoelectric devices that are capable of excitation by a signal generator, although other alternatives exist. For example, electromechanical devices, such as solenoid actuators, may be used, or mechanical devices, such as double-acting pneumatic actuators, may also be employed.

Determination of the position of the display 62 is accomplished by positional sensors attached to the display 62 that are aligned with the x and y-directions. The positional information obtained from these sensors provides feedback information for a closed loop control system, which will be described in more detail below. With reference again to FIG. 7, the horizontal position of the display 62 relative to the stationary support structure is sensed by a horizontal position sensor 70 that is hingeably attached to the display 62 by a rotational mount 82, and also attached to the support structure 100 by a similar rotational mount 90. A vertical position sensor 76 that has a hingeable attachment to the display 62 by a rotational mount 84, and is also attached to the support structure 100 by a rotational mount 92, similarly senses the vertical position of the display 62 relative to the stationary support structure 100. The horizontal position sensor 70 and the vertical position sensor 76 may be comprised of numerous well-known electromechanical devices, such as linear variable differential transformers (LVDT), E transformers, or variable capacitance-type displacement sensors, although other alternatives exist.

Still referring to FIG. 7, a computer 300 provides output signals to a display driver 320 that is electrically coupled to the display 64 through a conductor 330. As mentioned earlier, the signals supplied from the display driver 320 to the display 64 may provide for raster scanning of the display surface, or alternatively, for the matrix addressing of display elements on the display surface. The computer 300 is also electrically coupled to a control system 200 through an interface 310, which may provide analog to digital (A/D) or digital to analog (D/A) or any other required processes that allow the computer 300 to communicate with the control system 200.

A control system 200 that is capable of receiving positional input signals from the position sensors 70 and 76 through the conductors 220 and 230 is provided as shown in FIG. 7. The input signals transmitted to the control system 200 provide a continuous feedback loop for the system 200. The control system 200 also provides positional output signals to the actuators 72 and 74 through the conductors 240 and 210 to properly position the display 62 in response to the detected position. Although the control system 200 may employ any of the well-known control algorithms, a proportional-integral-differential algorithm is used.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope the invention, as those skilled in the relevant art will recognize. For example, optical sensors to sense the position of the surface by optical means may replace the electromechanical position sensors attached to the display. Further, the control system as described herein may in certain cases be replaced with a synchronizing device to achieve image stability. Moreover, it will be further appreciated that the images displayed by the display may be static images, or images from material having motion, such as animation, video, and the like. Still further, the various embodiments described above can be combined to provide still other embodiments. Accordingly, the invention is not limited by the disclosure, but instead the scope of the invention is to be determined entirely by the following claims.

What is claimed is:

1. An apparatus for masking defects in a visual display, comprising:
    a visual display unit having a plurality of display elements;
    a translation unit coupled to the visual display unit that is structured to impart motion to the display unit; and
    a control unit coupled to the translation unit and the display device that is structured to receive image signals from an image signal source and capable of exchanging signals with the translation unit and the display unit to controllably direct the movement of the display unit and to compensatingly shift the image signals, the signals being maintained at a fixed signal level as the image signals are shifted, the shifted signals concealing display element defects on the display surface.

2. The apparatus according to claim 1, wherein the translation unit imparts motion to the visual display unit in at least a first direction and a second direction, the second direction being substantially perpendicular to the first direction.

3. The apparatus according to claim 2, wherein the translation unit imparts a motion primarily in the first direction.

4. The apparatus according to claim 2, wherein the translation unit imparts a motion primarily in the second direction.

5. The apparatus according to claim 1, wherein the translation unit is mechanically coupled to the visual display unit.

6. The apparatus according to claim 1, wherein the translation unit is electromagnetically coupled to the visual display unit.

7. The apparatus according to claim 1, wherein the image signal source is a display driver attached to a computer.

8. The apparatus according to claim 1, wherein the image signal source is a video signal source.

9. The apparatus according to claim 1, wherein the visual display unit is further comprised of a field emission display.

10. The apparatus according to claim 1, wherein the visual display unit is further comprised of an active matrix liquid crystal display.

11. The apparatus according to claim 1, wherein the visual display unit is further comprised of a cathode ray tube.

12. A method for concealing a defective display element in a visual display surface, comprising:
    directing an image signal having a signal magnitude onto a first display element positioned in a first display location, the first display element being at least partially defective;
    translating a second display element into the first display location;
    directing the image signal onto the second display element while the second display element is in the first location while maintaining the signal magnitude.

13. The method according to claim 12 further comprising the step of translating the first display element into the first display location.

14. The method according to claim 12 further comprising the step of translating the first display element into a second display location.

15. The method according to claim 12, wherein the step of translating a second display element into the first display location comprises moving a second display element into the first location by a series of rectilinear movements.

16. The method according to claim 12, wherein the step of translating a second display element into the first display location comprises moving a second display element into the first location by horizontally translating the second display element into the first location.

17. The method according to claim 12, wherein the step of translating a second display element into the first display location comprises moving a second display element into the first location by vertically translating the second display element into the first location.

18. The method according to claim 12, wherein the step of translating a second display element into the first display location comprises moving a second display element into the first location by horizontally translating a second display element adjacent to the first display element into the first location.

19. The method according to claim 12, wherein the step of translating a second display element into the first display location comprises moving a second display element into the first location by vertically translating a second display element adjacent to the first display element into the first location.

20. The method according to claim 12, wherein the steps of directing the image signals are further comprised of raster scanning the display elements on the display surface.

21. The method according to claim 12, wherein the steps of directing the image signals are further comprised of matrix addressing the display elements on the display surface.

* * * * *